April 29, 1941. F. T. LIND 2,239,852
WIRE CUTTER
Filed April 12, 1939
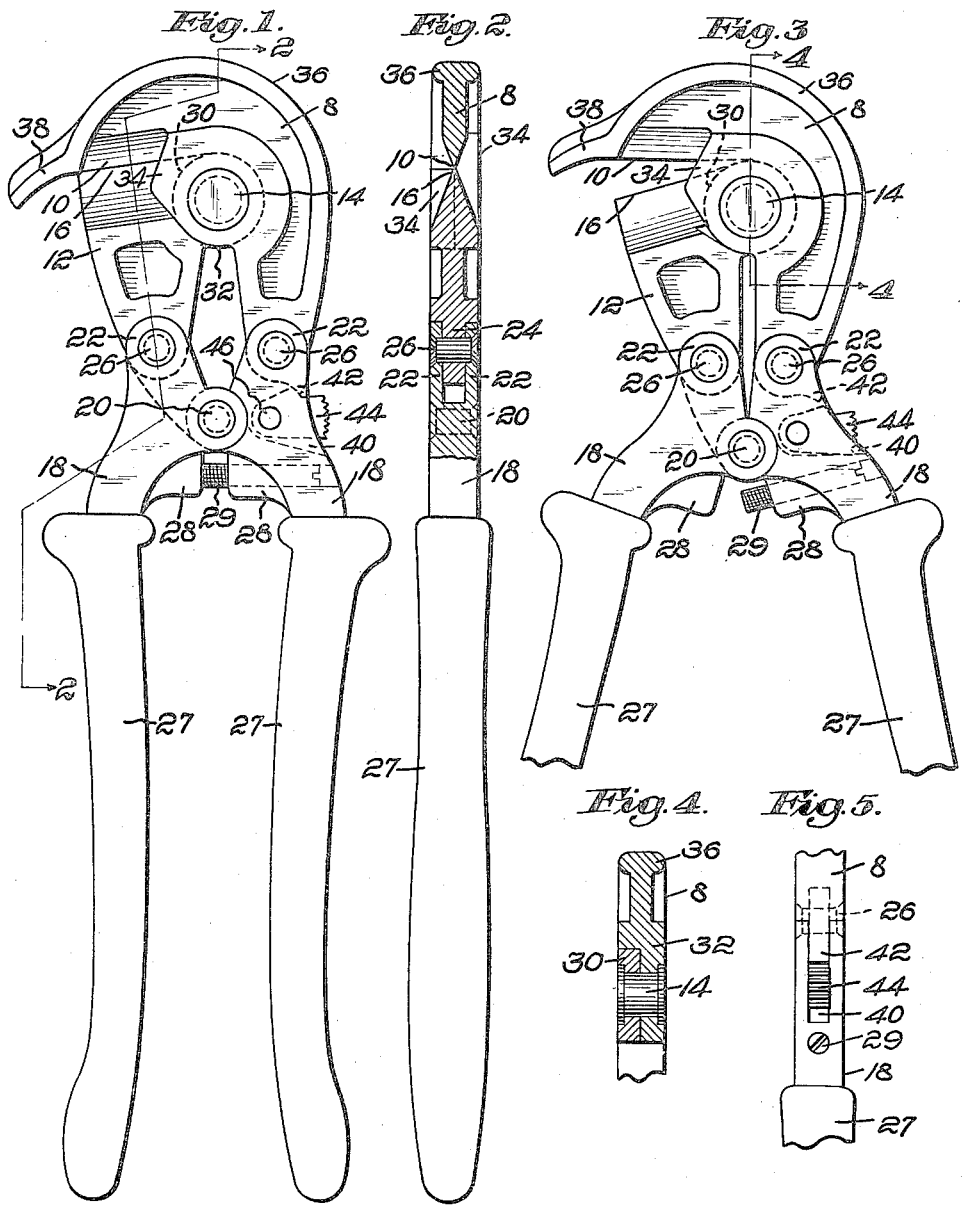
Inventor:
Francis T. Lind,
by Emery, Booth, Townsend, Miller & Weidner
Attys.

Patented Apr. 29, 1941

2,239,852

UNITED STATES PATENT OFFICE 2,239,852

WIRE CUTTER

Francis T. Lind, Everett, Mass., assignor to H. K. Porter, Inc., Everett, Mass., a corporation of Massachusetts Application April 12, 1939, Serial No. 267,515

4 Claims. (Cl. 30—193)

This invention relates to cutting tools and the object is to provide a powerful and efficient tool suitable for military use for cutting barbed wire entanglements, although the qualities which make it suitable for such use also permit its advantageous application in peaceful pursuits.

My invention will be well understood by reference to the following description taken in connection with the accompanying drawing, wherein:

Fig. 1 is a side elevation of the tool in closed position;

Fig. 2 is a section on the line 2—2 of Fig. 1;

Fig. 3 is a view similar to Fig. 1 showing the tool open and with parts broken away;

Fig. 4 is a section on the line 4—4 of Fig. 3; and

Fig. 5 is a fragmentary edge view as seen from the right of Fig. 1.

The tool shown by way of example in the drawing is a portable tool adapted to be operated by the grip of a single hand, yet sufficiently powerful readily to cut the heavy wire used in warfare. It embodies a head lever 8 having the general form of an inverted J, the overhanging arm of which is provided with the downwardly facing cutting edge 10. The companion head lever 12 is of a form roughly equivalent to the vertical arm of the lever 8 and is received beneath the overhanging arm and secured by means of the pivot pin 14 so that its edge 16 opposes the edge 10. As seen in Figs. 1 and 3, the assembly of the two levers provides a head portion for the tool of a generally oval form and with a side opening for engaging the work.

To operate the tool I have herein shown handle levers 18 pivoted together between their ends by a pivot pin 20 and having at their upper extremities pairs of ears 22, the circularly formed margins of which fit the margins of similarly formed recesses on the tails of the head levers which provide the central tenon-like members 24 which are received between the ears 22, the parts being connected together by the countersunk pivot pins 26. In the closing movement of the handles from the position of Fig. 3 to the position of Fig. 1, the upper segments thereof between the pivot 20 and the pivots 26 operate in the manner of a toggle to provide a powerful spreading action on the tails of the head levers and a correspondingly powerful cutting action of the edges 10 and 16.

The handles 18 are here shown as provided with rubber coverings 27 for purposes of electrical insulation in case the tool is to be used on electrically charged wires, as, for instance, in war-time entanglements.

On the inner side of the handles 18 and near the joint 20 are raised portions 28, one of which, that at the left in the figures, serves as an abutment for the end of a screw 29 threaded into the other, limiting the closing movement of the tool to avoid deleterious pressing action of the opposed edges 10 and 16 one upon the other. As the edges are sharpened, the screw may be backed off to compensate.

The joint at the pivot point 14 between the two head levers is best shown in Figs. 3 and 4, from which it will be seen that it is of the halving type, the smaller lever 12 being reduced in thickness to provide a hub 30 which is superimposed upon a similarly reduced hub portion 32 of the J-shaped lever 8. The latter, as seen in Figs. 1 and 3, is provided with an extension 34 which overlies the lever 12 where it is bevelled off to form the edge 16 and has a bluff outer face extending across the joint between the two edges 10 and 16 in all positions of the same (see Fig. 3) and forming a stop to prevent the entrance of the work to the bottom of the triangular throat formed by the opening jaws where it might jam.

The outer periphery of the J-shaped lever 8 is provided with a broad flange 36, and as is clear from Fig. 2, all the head portion of the tool and indeed the entire tool as far as the hand grips proper is organized within the projected outlines of the edges of this flange. To carry out this feature, the various pivot pins 14, 26 and 20 are of the countersunk type, as appears from Figs. 2 and 4. The head of the tool, being of generally oval contour as already described, can thus be easily inserted past obstructions to the point of operation and withdrawn without the likelihood of its being caught.

To facilitate engagement with the work, the flange 36 is herein extended to provide a laterally projecting hook 38 extending outwardly substantially as a continuation of the edge 14 by which hook the wire may be engaged and guided between the cutting edges of the tool. Preferably this hook is made of substantially the full width of the flange 36 so as to engage the wire for a considerable distance so that the latter tends to enter between the cutting edges in a position perpendicular to their plane of movement, which is the most favorable position for cutting and imposes least strain upon the tool.

I may provide means for normally holding the tool in the closed position of Fig. 1 when not in use to avoid accidental damage to the edges.

For this purpose I here show the outer surface of the right hand lever 18 (see Fig. 5) as provided with a recess 40 in line with the space between the ears 22 and opening thereto. The lever tail which is received between these ears is provided with an extension 42 having a curved under surface eccentric to its pivot 26 adapted to be engaged by a cooperatively formed surface on a detent 44 pivoted within the recess 40 on the pin 46. A portion of the detent 44 projects at the side of the tool for engagement by the finger to permit it to be retracted from the position of Fig. 1 to the position of Fig. 3 to release the tool for operation or, when the jaws are closed, to be again projected from the position of Fig. 3 to the position of Fig. 1 to hold them in that closed position.

I am aware that the invention may be embodied in other specific forms without departing from the spirit or essential attributes thereof, and I therefore desire the present embodiment to be considered in all respects as illustrative and not restrictive; reference being had to the appended claims rather than to the foregoing description to indicate the scope of the invention.

I claim:

1. A cutter comprising a first head lever of the general form of an inverted J and having a cutting edge at the inner side of the overhanging arm thereof extending substantially at right angles to the length of the two whereby it may be engaged in the manner of a hook over the further side of a wire, a second lever pivoted to the first received in the space beneath said arm and having an edge cooperating with the edge of the first, and means associated with the lever tails for manually actuating the tool, the head levers together defining a head of generally oval plan and the first lever having a broad exterior margin within the projected outlines of which are received at least those portions of the tool outward of the hand grips.

2. A cutting tool comprising a pair of jaw levers having opposed edges and superposed hub portions pivoted together, one of the hub portions having an outward extension having a bluff face positioned to extend across the joint between the two edges in all positions of the same to limit the entry of work therebetween.

3. A cutter comprising a first head lever of the general form of an inverted J and having a cutting edge at the inner side of the overhanging arm thereof, a second lever pivoted to the first received in the space beneath said arm and having an edge opposing the edge of the first, and means associated with the lever tails for manually actuating the tool, there being a lateral extension of the first lever having a broad inner face and occupying the entire thickness of the tool at the extremity of the first edge, extending therefrom free of abrupt reductions of width and disposed perpendicularly to the plane of movement of the edges whereby it may be slid across a wire to position the edge across the wire in position for a square cut.

4. A multiple lever tool comprising a pair of pivotally associated jaw-carrying levers, a pair of interpivoted handle levers having ears receiving the tails of the jaw-carrying levers and pivoted thereto, one of the levers having a recess opening to the space between said ears, the adjacent lever tail having a surface eccentric to its pivot presented to said recess, a detent pivoted in the recess to swing into cooperation with said surface and having a finger-engaging portion exposed at the side of the lever.

FRANCIS T. LIND.